US010341859B2

(12) United States Patent
Liu et al.

(10) Patent No.: US 10,341,859 B2
(45) Date of Patent: Jul. 2, 2019

(54) METHOD AND DEVICE OF GENERATING A KEY FOR DEVICE-TO-DEVICE COMMUNICATION BETWEEN A FIRST USER EQUIPMENT AND A SECOND USER EQUIPMENT

(71) Applicant: Nokia Technologies Oy, Espoo (FI)

(72) Inventors: Yang Liu, Beijing (CN); Da Jiang Zhang, Beijing (CN); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 597 days.

(21) Appl. No.: 14/433,725

(22) PCT Filed: Oct. 19, 2012

(86) PCT No.: PCT/CN2012/083191
§ 371 (c)(1),
(2) Date: Apr. 6, 2015

(87) PCT Pub. No.: WO2014/059657
PCT Pub. Date: Apr. 24, 2014

(65) Prior Publication Data
US 2015/0281953 A1   Oct. 1, 2015

Related U.S. Application Data

(63) Continuation of application No. PCT/CT2012/083191, filed on Oct. 19, 2012.

(51) Int. Cl.
H04W 12/04  (2009.01)
H04W 76/11  (2018.01)
(Continued)

(52) U.S. Cl.
CPC ............ *H04W 12/04* (2013.01); *H04L 9/0869* (2013.01); *H04W 76/11* (2018.02); *H04W 76/14* (2018.02);
(Continued)

(58) Field of Classification Search
CPC . H04W 12/04; H04W 76/021; H04W 76/023; H04W 76/046; H04L 9/0869; H04L 63/062; H04L 2463/061; H04L 2463/062
See application file for complete search history.

(56) References Cited

U.S. PATENT DOCUMENTS 7,181,015 B2 * 2/2007 Matt ....................... H04L 9/083
380/279
7,966,000 B2   6/2011 Semple et al.
(Continued)

FOREIGN PATENT DOCUMENTS

CN   101895877 A   11/2010
EP   2109278 A1   10/2009
(Continued)

OTHER PUBLICATIONS

"3rd Generation Partnership Project; Technical Specification Group Services and System Aspects; Key establishment between a UICC Hosting Device and a Remote Device (Release 10)", 3GPP TS 33.259, V10.0.0, Mar. 2011, pp. 1-28.
(Continued)

*Primary Examiner* — Oleg Korsak
*Assistant Examiner* — Devin E Almeida
(74) *Attorney, Agent, or Firm* — Mintz Levin Cohn Ferris Glovsky and Popeo, P.C.

(57) ABSTRACT

A method of generating a key for D2D communication between a first user equipment and a second user equipment in a first radio access node is disclosed. In an exemplary embodiment, the method may comprise: receiving a request
(Continued)

for D2D key generation from the first user equipment which is served by the first radio access node; determining whether the second user equipment is served by the first radio access node; when it is determined that the second user equipment is served by the first radio access node, generating a first random number and a second random number; generating a first D2D key based on the first random number and a second D2D key based on the second random number; sending the first D2D key and the second random number to the second user equipment; and sending the second D2D key and the first random number to the first user equipment; and when it is determined that the second user equipment is not served by the first radio access node, determining a second radio access node which serves the second user equipment; generating a first random number; generating a first D2D key based on the first random number; sending the first D2D key to the second radio access node; receiving a second D2D key from the second radio access node; and sending the second D2D key and the first random number to the first user equipment.

20 Claims, 11 Drawing Sheets

(51) Int. Cl.
*H04L 9/08* (2006.01)
*H04W 76/14* (2018.01)
*H04L 29/06* (2006.01)
*H04W 76/27* (2018.01)

(52) U.S. Cl.
CPC ...... *H04L 63/062* (2013.01); *H04L 2463/061* (2013.01); *H04L 2463/062* (2013.01); *H04W 76/27* (2018.02)

(56) References Cited

U.S. PATENT DOCUMENTS

| | | | | |
|---|---|---|---|---|
| 8,744,174 B2* | 6/2014 | Hamada | ................... | G06T 11/60 382/164 |
| 8,989,389 B2* | 3/2015 | Hakola | ................ | H04W 12/04 380/279 |
| 2004/0187001 A1* | 9/2004 | Bousis | ................... | G06F 21/445 713/175 |
| 2006/0174117 A1 | 8/2006 | Laitinen | | |
| 2007/0253376 A1* | 11/2007 | Bonta | ................... | H04L 9/0822 370/338 |
| 2007/0277035 A1* | 11/2007 | Patel | ..................... | H04L 9/0822 713/168 |
| 2008/0095361 A1* | 4/2008 | Wifvesson | ............ | H04L 9/0841 380/44 |
| 2008/0184032 A1 | 7/2008 | Li et al. | | |
| 2009/0220091 A1 | 9/2009 | Howard | | |
| 2009/0320102 A1* | 12/2009 | Ou | .......................... | H04L 51/38 726/4 |
| 2010/0009675 A1* | 1/2010 | Wijting | ............... | H04W 76/023 455/426.1 |
| 2010/0056156 A1 | 3/2010 | Xu et al. | | |
| 2011/0145575 A1 | 6/2011 | Blommaert et al. | | |
| 2011/0235802 A1 | 9/2011 | Kokkinen et al. | | |
| 2011/0320802 A1 | 12/2011 | Wang et al. | | |
| 2012/0033815 A1 | 2/2012 | Kuo | | |
| 2012/0077501 A1 | 3/2012 | Zhang et al. | | |
| 2013/0290696 A1* | 10/2013 | Broustis | .................... | H04L 9/08 713/150 |
| 2015/0245397 A1* | 8/2015 | Sachs | .................. | H04W 76/023 455/426.1 |

FOREIGN PATENT DOCUMENTS

| | | |
|---|---|---|
| WO | 2011/117677 A1 | 9/2011 |
| WO | 2011/147462 A1 | 12/2011 |
| WO | 2012/137633 A1 | 10/2012 |

OTHER PUBLICATIONS

"Key Refresh on Intra-MME Handovers", 3GPP TSG SA WG3 Security—SA3#47, S3-070306, Agenda item: SAE/LTE security, Nokia Siemens Networks, May 22-25, 2007, pp. 1-3.
"Use of Node Identities in Key Derivations", 3GPP TSG SA WG3 Meeting #48, S3-070555, Agenda item: 6.14, Ericsson, Jul. 10-13, 2007, pp. 1-5.
"Security and Trust in Mobile Application", Gemalto, Retrieved on Oct. 2008, Webpage available at : http://www.gemalto.com/telecom/download/security_trust_in_mobile_applications_pdf.
"3rd Generation Partnership Project; Technical Specification Group Services and System Aspects; Generic Authentication Architecture (GAA); Generic Bootstrapping Architecture (GBA) (Release 11)", 3GPP TS 33.220, V11.4.0, Sep. 2012, pp. 1-92.
Extended European Search Report received for corresponding European Patent Application No. 12886613.4, dated May 3, 2016, 7 pages.
International Search Report and Written Opinion received for corresponding Patent Cooperation Treaty Application No. PCT/CN2012/083191, dated Jun. 27, 2013, 13 pages.

* cited by examiner

METHOD AND DEVICE OF GENERATING A KEY FOR DEVICE-TO-DEVICE COMMUNICATION BETWEEN A FIRST USER EQUIPMENT AND A SECOND USER EQUIPMENT

RELATED APPLICATION

This application was originally filed as Patent Cooperation Treaty Application No. PCT/CN2012/083191 filed Oct. 19, 2012.

TECHNICAL FIELD OF THE INVENTION

The present invention relates to direct Device-to-Device (D2D) communication utilizing a mobile communication system for setup, and more particularly, to generation of a key for D2D communication.

BACKGROUND OF THE INVENTION

D2D communication is a kind of communication which allows two user equipments to communicate with each other directly, potentially under some control of a communication network provider. The two user equipments may be referred to as a D2D pair. The examples of D2D communication include direct communications in a cluster of proximity devices, autonomous D2D communication in a cellular network, etc.

Nowadays, many investigations and researches about supports of network-supported D2D communication in the 3G mobile communication system, e.g. Long Term Evolution (LTE) system, have been conducted. One example is to introduce D2D registration server function (DRSF) for registration, authentication and identification of D2D devices. The D2D device can registers to the network with a D2D device identifier and temporary user equipment identifier (e.g. S-TMSI). The DRSF can be located in a radio access network entity (e.g. an eNodeB or a femtocell) or in a core network entity (e.g. a Mobile Management Entity) or in both with a hierarchical structure.

However, security related procedures of D2D communication have not been fully specified. Currently, security keys for D2D communication are generated in core network side. The key generation involves Home Subscriber Server (HSS), Home Location Register (HLR), AAA server, or Mobile Management Entity (MME). The key generation may be initiated by user equipment, eNodeB or MME. In the user equipment initiated solution, for example, each device of a D2D pair may generate a base value and a ciphering key from the base value, and send the base value to the MME. The MME can generate ciphering keys from the base values, combine the keys and send the combined key to the D2D pair. Then each device of the D2D pair can obtain the ciphering key that is same as the ciphering key generated by the pairing device from the combined key.

However, for D2D service which will introduce a large scale of device numbers, the participation of the core network entities will bring too much work load and signaling overhead to the backend, which is already struggling today with the load. It is desirable to generate the security keys for D2D communication without HSS/HLR/MME involvement.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The present invention is directed to a method of generating a key for D2D communication between a first user equipment and a second user equipment in a first radio access node and related radio access node, a method of generating a key for D2D communication between a first user equipment and a second user equipment in a network device and related network device.

According to one embodiment, a method of generating a key for Device-to-Device (D2D) communication between a first user equipment and a second user equipment in a first radio access node comprises: receiving a request for D2D key generation from the first user equipment which is served by the first radio access node; determining whether the second user equipment is served by the first radio access node; when it is determined that the second user equipment is served by the first radio access node: generating a first random number and a second random number; generating a first D2D key based on the first random number and a second D2D key based on the second random number; sending the first D2D key and the second random number to the second user equipment, wherein the second random number is used by the second user equipment to generate the second D2D key, and the first D2D key is used together with the generated second D2D key to generate a third D2D key; and sending the second D2D key and the first random number to the first user equipment, wherein the first random number is used by the first user equipment to generate the first D2D key, and the second D2D key is used together with the generated first D2D key to generate the third D2D key; and when it is determined that the second user equipment is not served by the first radio access node: determining a second radio access node which serves the second user equipment; generating a first random number; generating a first D2D key based on the first random number; sending the first D2D key to the second radio access node; receiving a second D2D key from the second radio access node; and sending the second D2D key and the first random number to the first user equipment, wherein the first random number is used by the first user equipment to generate the first D2D key, and the second D2D key is used together with the generated first D2D key to generate a third D2D key.

In an exemplary embodiment, when the first and second user equipments are both served by the first radio access node, the generating of the first D2D key and the second D2D key may comprise: generating the first D2D key based on the first random number, a first security key that secures an ongoing communication between the first user equipment and the first radio access node, and an identifier of the first radio access node; and generating the second D2D key based on the second random number, a second security key that secures an ongoing communication between the second user equipment and the first radio access node, and the identifier of the first radio access node.

In an exemplary embodiment, when the first and second user equipments are served by the first and second radio access nodes respectively, the generating of the first D2D key may comprise: generating the first D2D key based on the first random number, a first security key that secures an ongoing communication between the first user equipment and the first radio access node, and an identifier of the first radio access node.

In an exemplary embodiment, the first security key may be a ciphering key for ciphering user plane data of the first user equipment, and the second security key may be a ciphering key for ciphering user plane data of the second user equipment.

In an exemplary embodiment, the first security key and the second security key may be integrity protection keys.

In an exemplary embodiment, the sending of the first D2D key and the second random number to the second user equipment may comprise: generating a radio resource control message which contains the first D2D key and the second random number; ciphering and integrity protecting the radio resource control message with an access stratum key of the second user equipment; and sending the ciphered and integrity protected radio resource control message to the second user equipment.

In an exemplary embodiment, the sending of the first D2D key and the second random number to the second user equipment may comprise: generating a user plane data packet which contains the first D2D key and the second random number; ciphering the user plane data packet with the second security key; and sending the ciphered user plane data packet to the second user equipment.

In an exemplary embodiment, the sending of the second D2D key and the first random number to the first user equipment may comprise: generating a radio resource control message which contains the second D2D key and the first random number; ciphering and integrity protecting the radio resource control message with an access stratum key of the first user equipment; and sending the ciphered and integrity protected radio resource control message to the first user equipment.

In an exemplary embodiment, the sending of the second D2D key and the first random number to the first user equipment may comprise: generating a user plane data packet which contains the second D2D key and the first random number; ciphering the user plane data packet with the first security key; and sending the ciphered user plane data packet to the first user equipment.

In an exemplary embodiment, the sending of the first D2D key to the second radio access node may comprise: generating an inter radio access node message which contains the first D2D key; and sending the inter radio access node message to the second radio access node.

In an exemplary embodiment, the first and second radio access nodes are eNodeBs or femtocells.

According to another embodiment, a method of generating a key for D2D communication between a first user equipment and a second user equipment in a network device comprises: receiving a request for D2D key generation; generating a first random number and a second random number; generating a first D2D key based on the first random number and a second D2D key based on the second random number; providing the first D2D key and the second random number to the second user equipment, wherein the second random number is used by the second user equipment to generate the second D2D key, and the first D2D key is used together with the generated second D2D key to generate a third D2D key; and providing the second D2D key and the first random number to the first user equipment, wherein the first random number is used by the first user equipment to generate the first D2D key, and the second D2D key is used together with the generated first D2D key to generate the third D2D key.

In an exemplary embodiment, the generating of the first D2D key and the second D2D key may comprise: generating the first D2D key based on the first random number, a first security key that secures an ongoing communication between the first user equipment and a first radio access node that serves the first user equipment, and an identifier of the first radio access node; and generating the second D2D key based on the second random number, a second security key that secures an ongoing communication between the second user equipment and a second radio access node that serves the second user equipment, and the identifier of the second radio access node.

In an exemplary embodiment, the first security key may be a ciphering key for ciphering user plane data of the first user equipment, and the second security key may be a ciphering key for ciphering user plane data of the second user equipment.

In an exemplary embodiment, the first security key and the second security key may be integrity protection keys.

In an exemplary embodiment, the network device may be located in a radio access network, and the providing of the first D2D key and the second random number to the second user equipment may comprise: generating an inter radio access node message which contains the first D2D key and the second random number; and sending the inter radio access node message to the second radio access node, wherein the first D2D key and the second random number in the inter radio access node message are sent, by the second radio access node, to the second user equipment by means of a radio resource control message or a user plane data packet, and the providing of the second D2D key and the first random number to the first user equipment may comprise: generating an inter radio access node message which contains the second D2D key and the first random number; and sending the inter radio access node message to the first radio access node, wherein the second D2D key and the first random number in the inter radio access node message are sent, by the first radio access node, to the first user equipment by means of a radio resource control message or a user plane data packet.

In an exemplary embodiment, the network device is located in a core network, and the providing of the first D2D key and the second random number to the second user equipment may comprise: generating a first message which contains the first D2D key and the second random number; and sending the first message to the second radio access node, wherein the first D2D key and the second random number in the first message are sent, by the second radio access node, to the second user equipment by means of a radio resource control message or a user plane data packet, and the providing of the second D2D key and the first random number to the first user equipment may comprise: generating a second message which contains the first D2D key and the second random number; and sending the second message to the first radio access node, wherein the second D2D key and the first random number in the second message are sent, by the first radio access node, to the first user equipment by means of a radio resource control message or a user plane data packet.

According to another embodiment, a first radio access node for generating a key for D2D communication between a first user equipment and a second user equipment comprise: at least one processor; and at least one memory including computer program code; the at least one memory and the computer program code configured to, with the at least one processor, cause the first radio access node to perform at least the following: receiving a request for D2D key generation from the first user equipment which is served by the first radio access node; determining whether the second user equipment is served by the first radio access node; when it is determined that the second user equipment is served by the first radio access node, generating a first random number and a second random number; generating a first D2D key based on the first random number and a second D2D key based on the second random number; sending the first D2D key and the second random number to the second user equipment, wherein the second random number is used by the second user equipment to generate the second D2D key, and the first D2D key is used together with the generated second D2D key to generate a third D2D key; and sending the second D2D key and the first random number to the first user equipment, wherein the first random number is used by the first user equipment to generate the first D2D key, and the second D2D key is used together with the generated first D2D key to generate the third D2D key; and when it is determined that the second user equipment is not served by the first radio access node, determining a second radio access node which serves the second user equipment; generating a first random number; generating a first D2D key based on the first random number; sending the first D2D key to the second radio access node; receiving a second D2D key from the second radio access node; and sending the second D2D key and the first random number to the first user equipment, wherein the first random number is used by the first user equipment to generate the first D2D key, and the second D2D key is used together with the generated first D2D key to generate a third D2D key.

According to another embodiment, a network device of generating a key for D2D communication between a first user equipment and a second user equipment comprises: at least one processor; and at least one memory including computer program code; the at least one memory and the computer program code configured to, with the at least one processor, cause the network device to perform at least the following: receiving a request for D2D key generation; generating a first random number and a second random number; generating a first D2D key based on the first random number and a second D2D key based on the second random number; providing the first D2D key and the second random number to the second user equipment, wherein the second random number is used by the second user equipment to generate the second D2D key, and the first D2D key is used together with the generated second D2D key to generate a third D2D key; and providing the second D2D key and the first random number to the first user equipment, wherein the first random number is used by the first user equipment to generate the first D2D key, and the second D2D key is used together with the generated first D2D key to generate the third D2D key.

According to another embodiment, a computer program product includes one or more sequences of one or more instructions which, when executed by one or more processors, cause an apparatus to at least perform the steps of a method of generating a key for D2D communication between a first user equipment and a second user equipment in a first radio access node.

According to another embodiment, a computer program product includes one or more sequences of one or more instructions which, when executed by one or more processors, cause an apparatus to at least perform the steps of a method of generating a key for D2D communication between a first user equipment and a second user equipment in a network device.

According to another embodiment, an apparatus of generating a key for D2D communication between a first user equipment and a second user equipment in a first radio access node comprises: means for receiving a request for D2D key generation from the first user equipment which is served by the first radio access node; means for determining whether the second user equipment is served by the first radio access node; means for, when it is determined that the second user equipment is served by the first radio access node, generating a first random number and a second random number; means for generating a first D2D key based on the first random number and a second D2D key based on the second random number; means for sending the first D2D key and the second random number to the second user equipment, wherein the second random number is used by the second user equipment to generate the second D2D key, and the first D2D key is used together with the generated second D2D key to generate a third D2D key; means for, when it is determined that the second user equipment is not served by the first radio access node, determining a second radio access node which serves the second user equipment; means for generating a first random number; means for generating a first D2D key based on the first random number; means for sending the first D2D key to the second radio access node; means for receiving a second D2D key from the second radio access node; and means for sending the second D2D key and the first random number to the first user equipment, wherein the first random number is used by the first user equipment to generate the first D2D key, and the second D2D key is used together with the generated first D2D key to generate the third D2D key.

According to another embodiment, an apparatus of generating a key for D2D communication between a first user equipment and a second user equipment in a network device comprises: means for receiving a request for D2D key generation; means for generating a first random number and a second random number; means for generating a first D2D key based on the first random number and a second D2D key based on the second random number; means for providing the first D2D key and the second random number to the second user equipment, wherein the second random number is used by the second user equipment to generate the second D2D key, and the first D2D key is used together with the generated second D2D key to generate a third D2D key; and means for providing the second D2D key and the first random number to the first user equipment, wherein the first random number is used by the first user equipment to generate the first D2D key, and the second D2D key is used together with the generated first D2D key to generate the third D2D key.

Generally, all terms used in this specification are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those skilled in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE EMBODIMENTS

In the following description of the various illustrative embodiments, reference is made to the accompanying drawings, which form a part thereof, and in which are shown by way of illustration various exemplary embodiments in which the invention may be practiced. It is to be understood that other embodiments may be utilized and structural and functional modifications may be made without departing from the scope of the present invention.

Figure 1:
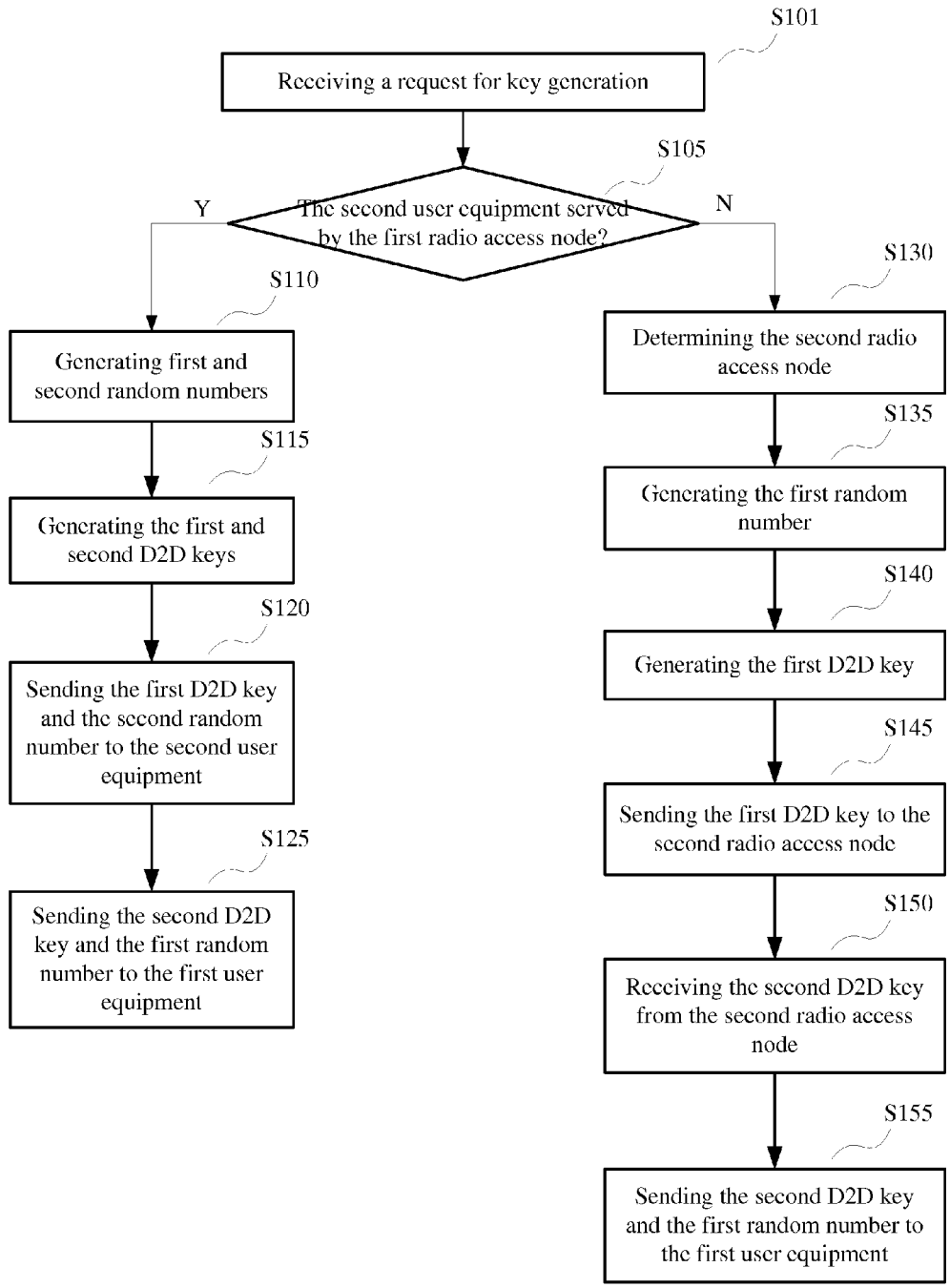
FIG. 1 is a flow chart illustrating the method of generating a key for D2D communication between a first user equipment and a second user equipment in a first radio access node according to an exemplary embodiment of the present invention.

FIG. 1 shows a flow chart illustrating the method of generating a key for D2D communication between a first user equipment and a second user equipment in a first radio access node according to an exemplary embodiment of the present invention. This embodiment will be described in detail in conjunction with the figure.

As shown in FIG. 1, at step S101, the first radio access node receives a request for D2D key generation from the first user equipment. In this embodiment, the first user equipment is served by the first radio access node. The request for D2D key is usually sent when the D2D connection between the first user equipment and the second user equipment is initiated. At this point, there is an ongoing communication between the first user equipment and the first radio access node, for example, an Evolved Packet System (EPS) service. Thus, the first user equipment is now in RRC_Connected state with the first radio access node. Meanwhile, the second user equipment is also in RRC_Connected state and there is an ongoing communication between the second user equipment and its serving radio access node. The request for D2D key generation may comprise identifiers of the first user equipment and the second user equipment.

Then at step S105, the first radio access node determines whether the second user equipment is served by the first radio access node. It can be determined based on the identifier of the second user equipment.

If it is determined that the second user equipment is served by the first radio access node ("Y" in step S105), i.e. the first and second user equipments are both under the control of the first radio access node, at step S110 the first radio access node generates a first random number and a second random number.

Then at step S115, the first radio access node generates a first D2D key $K_{D2D1}$ based on the first random number RAND1 and generates a second D2D key $K_{D2D2}$ based on the second random number RAND2. In this embodiment, the D2D keys can be generated utilizing a Key Derivation Function (KDF).

For the first D2D key $K_{D2D1}$, the first random number RAND1, a first security key and an identifier of the first radio access node can be used as input parameters of KDF. The first security key is used to secure the ongoing communication between the first user equipment and the first radio access node, and is shared between the first user equipment and the first radio access node. The first security key may be, for example, a ciphering key $K_{UP1}$ for ciphering user plane data of the first user equipment, or an integrity protection key.

For the second D2D key $K_{D2D2}$, the second random number RAND2, a second security key and the identifier of the first radio access node are used as input parameters of KDF. The second security key is used to secure the ongoing communication between the second user equipment and the first radio access node, and shared between the second user equipment and the first radio access node. The second security key may be, for example, a ciphering key $K_{UP2}$ for ciphering user plane data of the second user equipment, or an integrity protection key.

It would be appreciated for a person skilled in the art that other input parameters may be used for KDF, such as the identifiers of the first and second user equipments. In addition, it would be appreciated for a person skilled in the art that the security key may be any other kind of security key suitable for secure the communication.

After generating the first D2D key $K_{D2D1}$ and the second D2D key $K_{D2D2}$, at step S120, the first radio access node sends the first D2D key $K_{D2D1}$ and the second random number RAND2 to the second user equipment. The transmission of the first D2D key $K_{D2D1}$ and the second random number RAND2 will be protected.

In one implementation, the first radio access node may use a radio resource control (RRC) message to send the first D2D key $K_{D2D1}$ and the second random number RAND2. For example, the radio resource control message may be RRC Connection Reconfiguration message. Specifically, the first radio access node first generates a RRC message which contains the first D2D key $K_{D2D1}$ and the second random number RAND2. Then the first radio access node ciphers and integrity protects the RRC message with an access stratum (AS) key of the second user equipment, for example. The AS key may contain a RRC integrity protection key $K_{RRCint}$ and a RRC ciphering key $K_{RRCenc}$. Then the ciphered and integrity protected RRC message is sent to the second user equipment by the first radio access node.

In another implementation, the first radio access node may use a user plane data packet to send the first D2D key $K_{D2D1}$ and the second random number RAND2. Specifically, the first radio access node generates a user plane data packet which contains the first D2D key $K_{D2D1}$ and the second random number RAND2. Then the first radio access node ciphers the user plane data packet with the second security key, and finally sends the ciphered user plane data packet to the second user equipment.

It would be appreciated for a person skilled in the art that any other message suitable for carrying the key and random number can be used.

Upon receipt of the first D2D key $K_{D2D1}$ and the second random number RAND2, the second user equipment may generate the second D2D key $K_{D2D2}$ based on the second random number RAND2, the second security key (e.g. the ciphering key $K_{UP2}$) and the identifier of the first radio access node, and then generate a third D2D key $K_{D2D}$ based on the received first D2D key $K_{D2D1}$ and the generated second D2D key $K_{D2D2}$. For example, $K_{D2D}=K_{D2D1}$ XOR $K_{D2D2}$, or $K_{D2D}=KDF(K_{D2D1}, K_{D2D2})$.

Then at step S125, the first radio access node sends the second D2D key $K_{D2D2}$ and the first random number RAND1 to the first user equipment. Similar to the transmission of the first D2D key $K_{D2D1}$ and the second random number RAND2, the transmission of the second D2D key $K_{D2D2}$ and the first random number RAND1 will be also protected.

In one implementation, the first radio access node uses a RRC message. Specifically, the first radio access node generates a RRC message which contains the second D2D key $K_{D2D2}$ and the first random number RAND1, and ciphers and integrity protects the RRC message with an AS key of the first user equipment. For example, the AS key may contain a RRC integrity protection key $K_{RRCint}$ and a RRC ciphering key $K_{RRCenc}$. Then the first radio access node sends the ciphered and integrity protected RRC message to the first user equipment.

In another implementation, the first radio access node uses a user plane data packet. Specifically, the first radio access node generates a user plane data packet which contains the second D2D key $K_{D2D2}$ and the first random number RAND1. Then the first radio access node ciphers the user plane data packet with the first security key, and finally sends the ciphered user plane data packet to the first user equipment.

When receiving the second D2D key $K_{D2D2}$ and the first random number RAND1, the first user equipment may generate the first D2D key $K_{D2D1}$ based on the first random number RAND1, the first security key and the identifier of the first radio access node, and then generates the third D2D key $K_{D2D}$ based on the generated first D2D key $K_{D2D1}$ and the received second D2D key $K_{D2D2}$. For example, $K_{D2D}=K_{D2D1}$ XOR $K_{D2D2}$, or $K_{D2D}=KDF(K_{D2D1}, K_{D2D2})$.

It should be noted that the steps S120 and S125 may be executed concurrently.

Through the above operations, the first and second user equipments under the control of the same radio access node can obtain the same third D2D key $K_{D2D}$ for the D2D communication.

If it is determined at step S105 that the second user equipment is not served by the first radio access node ("N" in the step S105), i.e. the first user equipment is under the control of the first radio access node and the second user equipment is under the control of another radio access node (hereinafter referred to as "a second radio access node"), at step S130, the first radio access node determines the second radio access node which serves the second user equipment. For example, based on the identifier of the second user equipment, the first radio access node may query the HSS/HLR or MME to obtain the second radio access node.

At step S135, the first radio access node generates a first random number RAND1. Then at step S140, the first radio access node generates a first D2D key $K_{D2D1}$ based on the first random number. As described above, the first D2D key $K_{D2D1}$ can be generated utilizing the first random number RAND1, the first security key and the identifier of the first radio access node as the input parameters of the KDF.

Then at step S145, the first radio access node sends the first D2D key $K_{D2D1}$ to the second radio access node together with the identifiers of the first and second user equipments. The first radio access node may utilize an inter radio access node message to transmit the first D2D key $K_{D2D1}$ and the identifiers of the first and second user equipments. For example, the first radio access node and the second access node can communicate with each other via an X2 interface utilizing X2 Application Protocol (X2AP). In this case, the first radio access node may generate an X2AP message which contains the first D2D key $K_{D2D1}$. The X2AP message may be newly defined or may be an existing X2AP message, such as ENB CONFIGURATION UPDATE message. Then the first radio access node may send the X2AP message to the second radio access node. A person skilled in the art can understand that other inter radio access node message than the X2AP message may also be used to transmit the D2D key and the identifier of the user equipment.

When receiving the first D2D key $K_{D2D1}$ and the identifiers of the first and second user equipments, the second radio access node may generate a second random number RAND2, and generate a second D2D key $K_{D2D2}$ based on the second random number RAND2, the second security key that secures the ongoing communication between the second radio access node and the second user equipment and the identifier of the second radio access node. Then the second radio access node may send the first D2D key $K_{D2D1}$ and the second random number RAND2 to the second user equipment by means of the RRC message or user plane data packet protected by the AS key of the second user equipment or the second security key. The second user equipment may generate the second D2D key $K_{D2D2}$ based on the second random number RAND2, the second security key and the identifier of the second radio access node, and then generate the third D2D key $K_{D2D}$ based on the received first D2D key $K_{D2D1}$ and the generated second D2D key $K_{D2D2}$.

Moreover, after generating the second D2D key $K_{D2D2}$, the second radio access node may send the second D2D key $K_{D2D2}$ back to the first radio access node via the X2 interface. Upon receipt of the second D2D key $K_{D2D2}$ from the second radio access node (step S150), at step S155, the first radio access node may send the second D2D key $K_{D2D2}$ and the first random number RAND1 to the first user equipment. As described above, the first radio access node may use the RRC message or the user plane data packet protected by the AS key of the first user equipment or the first security key to send the second D2D key $K_{D2D2}$ and the first random number RAND1.

The first user equipment, upon receipt of the second D2D key $K_{D2D2}$ and the first random number RAND1, may generate the first D2D key $K_{D2D1}$ based on the first random number RAND1, the first security key and the identifier of the first radio access node, and then generate the third D2D key $K_{D2D}$ based on the generated first D2D key $K_{D2D1}$ and the received second D2D key $K_{D2D2}$.

Through the above operations, the first and second user equipments under the control of the different radio access nodes can obtain the same third D2D key $K_{D2D}$.

In addition, the radio access node in this embodiment may be an eNodeB, a femtocell, or any other suitable network access node.

It can be seen from the above description that the method of this embodiment may generate the D2D key for the D2D communication at radio access network side, without involvement of the HSS/HLR or MME, thereby relieving the burden of the HSS/HLR or MME for the D2D communication related security.

In the above description, the request is sent from the first user equipment, but the request may be sent from the second user equipment, and this embodiment may also be applied.

Figure 2:
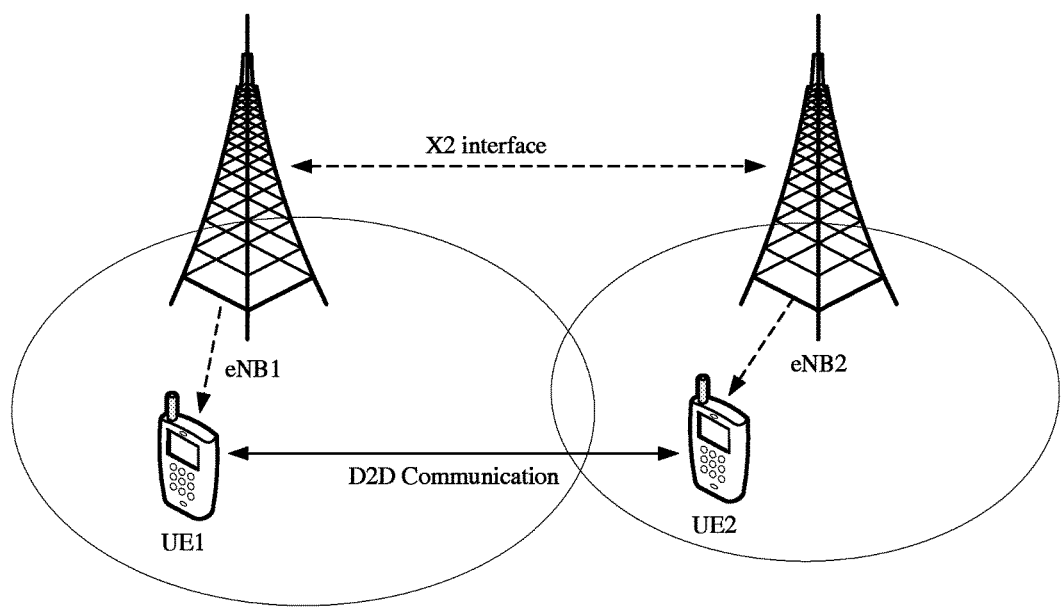
FIG. 2 is a schematic diagram of an exemplary LTE communication system in which the method of FIG. 1 can be implemented.

FIG. 2 is a schematic diagram of an exemplary LTE communication system in which the method of FIG. 1 can be implemented. As shown in FIG. 2, the exemplary LTE communication may comprise two eNodeBs eNB1, eNB2. For the sake of simplicity, only two eNodeBs are shown in FIG. 2, but more than two eNodeBs can be included in the LTE communication system. The user equipments UE1, UE2 may set up D2D communication between them. The user equipment UE1 may be in the coverage of the eNodeB eNB1 and the user equipment UE2 may be in the coverage of the eNodeB eNB2, which indicates "inter-eNodeB" scenario. Additionally, the user equipments UE1, UE2 may be in the coverage of the same eNodeB eNB1, which indicates "intra-eNodeB" scenario (not shown).

The key generation procedures for the intra-eNodeB scenario and the inter-eNodeB scenario will be described next in conjunction with FIGS. 3 and 4.

Figure 3:
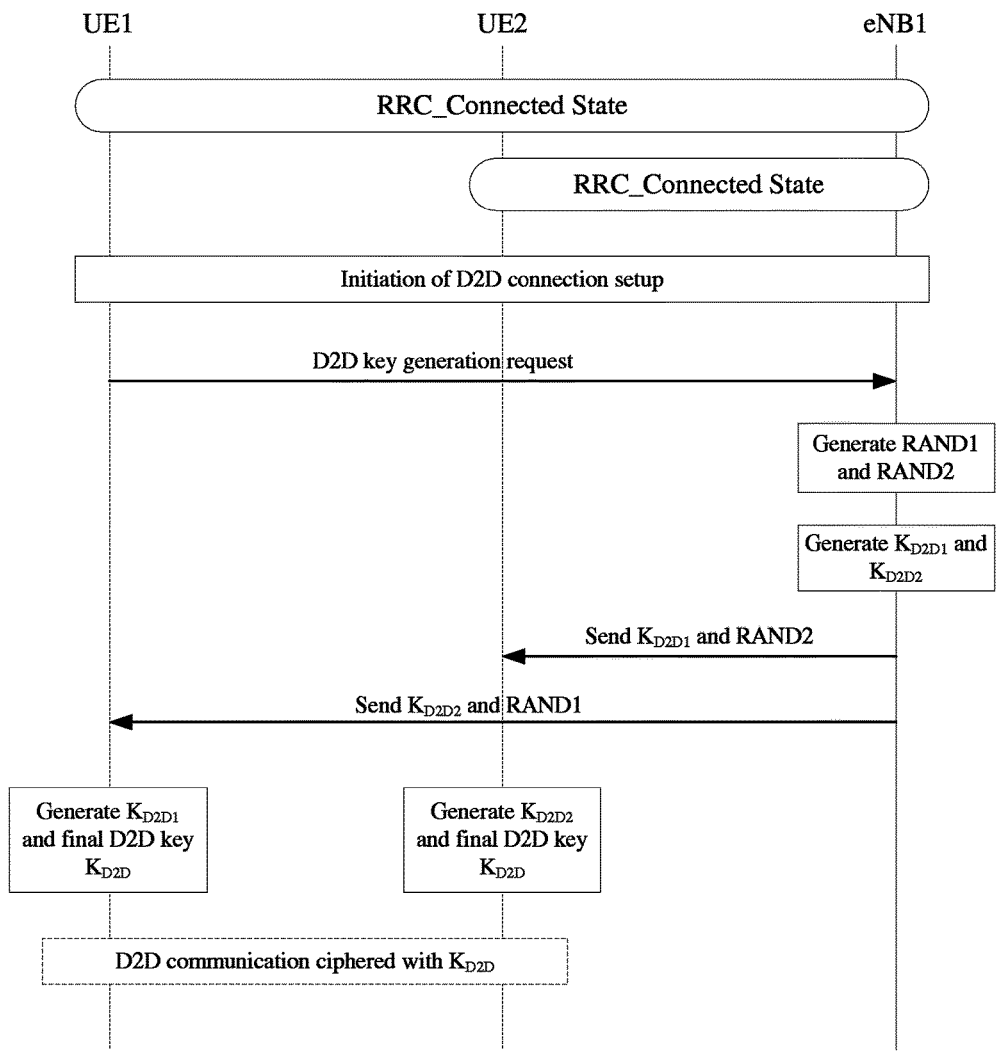
FIG. 3 is a signal chart illustrating a key generation procedure for intra-eNodeB scenario in the LTE communication system of FIG. 2.

FIG. 3 shows a signal chart illustrating the key generation procedure for the intra-eNodeB scenario in the LTE communication system of FIG. 2. In this case, the user equipments UE1, UE2 and the eNodeB eNB1 will be involved.

As shown in FIG. 3, the user equipments UE1, UE2 are both in the RRC_Connected state. There is an ongoing EPS service between the user equipment UE1 and the eNodeB eNB1, and there is also an ongoing EPS service between the user equipment UE2 and the eNodeB eNB1.

D2D connection setup is initiated between the user equipments UE1 and UE2. The user equipment UE1 sends a D2D key generation request to the eNodeB eNB1. The request may comprise the identifier of the user equipment UE2.

The eNodeB eNB1 generates a first random number RAND1 and a second random number RAND2, and generates a first D2D key $K_{D2D1}$ and a second D2D key $K_{D2D2}$. The first D2D key $K_{D2D1}$ is generated based on the security key $K_{UP1}$, the first random number RAND1 and the identifier of the eNodeB eNB1. The security key $K_{UP1}$ is a ciphering key used for ciphering the user plane data of the user equipment UE1 for the ongoing EPS service. Similarly, the second D2D key $K_{D2D2}$ is generated based on the security key $K_{UP2}$, the second random number RAND2 and the identifier of the eNodeB eNB1. The security key $K_{UP2}$ is a ciphering key used for ciphering the user plane data of the user equipment UE2 for the ongoing EPS service.

Then the eNodeB eNB1 can send the first D2D key $K_{D2D1}$ and the second random number RAND2 to the user equipment UE2 protected by the AS key of the user equipment UE2 using the RRC message. Meanwhile, the eNodeB eNB1 can send the second D2D key $K_{D2D2}$ and the first random number RAND1 to the user equipment UE1 protected by the AS key of the user equipment UE1 using the RRC message.

The user equipments UE1 can generate the first D2D key $K_{D2D1}$ based on the security key $K_{UP1}$, the first random number RAND1 and the identifier of the eNodeB eNB1, and then generates the third D2D key $K_{D2D}$ based on the generated first D2D key $K_{D2D1}$ and the received second D2D key $K_{D2D2}$. Also, the user equipments UE2 can generate the second D2D key $K_{D2D2}$ based on the security key $K_{UP2}$, the second random number RAND2 and the identifier of the eNodeB eNB1, and then generates the third D2D key $K_{D2D}$ based on the generated second D2D key $K_{D2D2}$ and the received first D2D key $K_{D2D1}$. Thus the D2D communication between the user equipments UE1 and UE2 can be ciphered with the third D2D key $K_{D2D}$.

Figure 4:
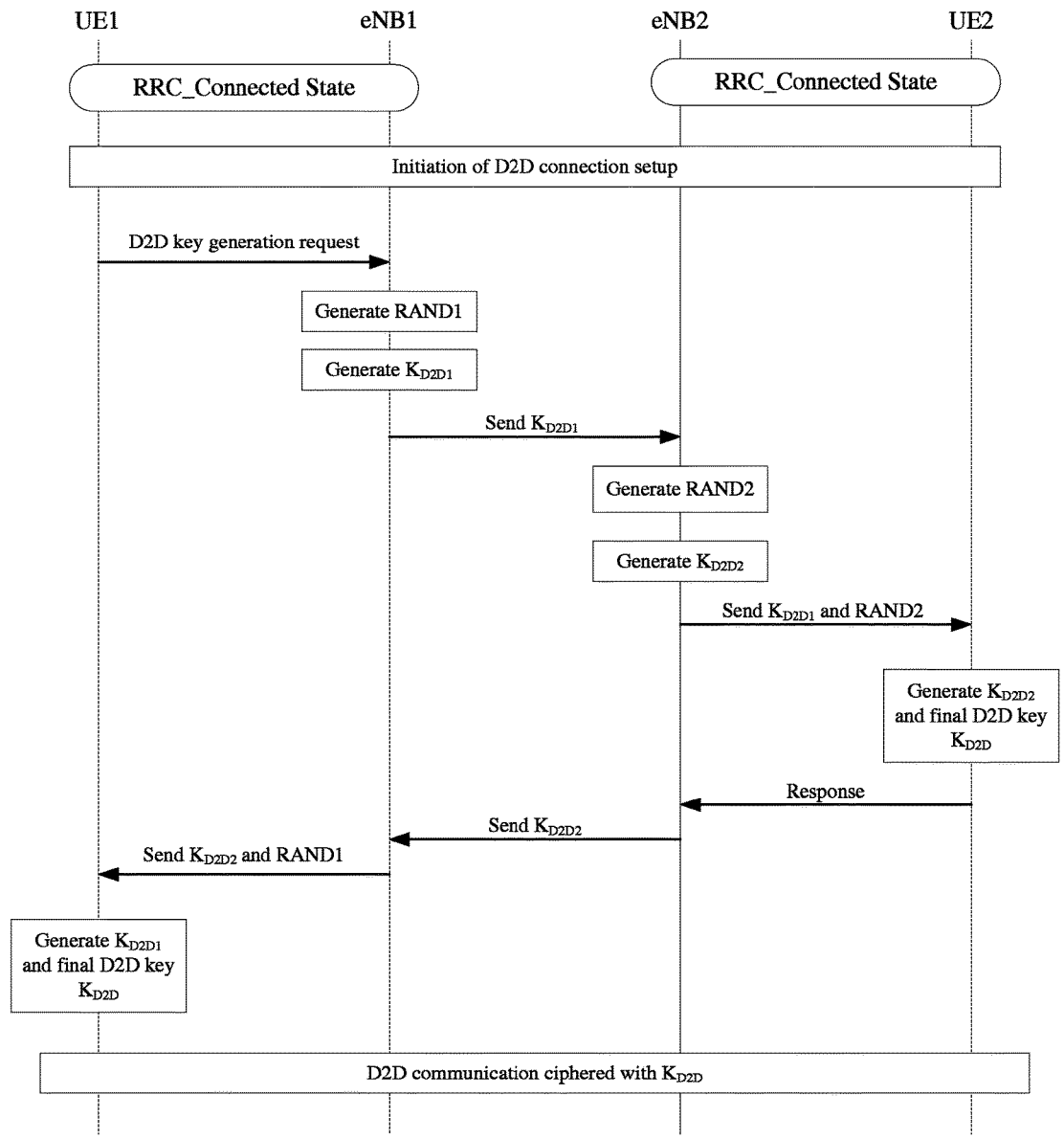
FIG. 4 is a signal chart illustrating a key generation procedure for inter-eNodeB scenario in the LTE communication system of FIG. 2.

FIG. 4 shows a signal chart illustrating the key generation procedure for the inter-eNodeB scenario in the LTE communication system of FIG. 2. In this case, the user equipments UE1, UE2 and the eNodeBs eNB1, eNB2 will be involved.

As shown in FIG. 4, the user equipment UE1 is in RRC Connected state under the eNodeB eNB1, and the user equipment UE2 is in RRC_Connected state under the eNodeB eNB2. There is an ongoing EPS service between the user equipment UE1 and the eNodeB eNB1, and there is also an ongoing EPS service between the user equipment UE2 and the eNodeB eNB2. The eNodeBs eNB1, eNB2 are communicated with each other via the X2 interface.

D2D connection setup is initiated between the user equipments UE1 and UE2. The user equipment UE1 sends a D2D key generation request to the eNodeB eNB1. The request may comprise the identifier of the user equipment UE2.

The eNodeB eNB1 generates a first random number RAND1 and a first D2D key $K_{D2D1}$. The first D2D key $K_{D2D1}$ is generated based on the security key $K_{UP1}$, the first random number RAND1 and the identifier of the eNodeB eNB1. The security key $K_{UP1}$ is a ciphering key used for ciphering the user plane data of the user equipment UE1 for the ongoing EPS service. Then the eNodeB eNB1 sends the first D2D key $K_{D2D1}$ and the identifiers of the user equipments UE1, UE2 to the eNodeB eNB2 via the X2 interface utilizing the X2AP message.

The eNodeB eNB2 then generates a second random number RAND2, and generates a second D2D key $K_{D2D2}$ for the user equipment UE2. The second D2D key $K_{D2D2}$ is generated based on the security key $K_{UP2}$, the second random number RAND2 and the identifier of the eNodeB eNB2. The security key $K_{UP2}$ is a ciphering key used for ciphering the user plane data of the user equipment UE2 for the ongoing EPS service. Then the eNodeB eNB2 sends the first D2D key $K_{D2D1}$ and the second random number RAND2 protected by the AS key of the user equipment UE2 to the user equipment UE2.

The user equipment UE2 generates the second D2D key $K_{D2D2}$ based on the security key $K_{UP2}$, the received second random number RAND2 and the identifier of the eNodeB eNB2, and then generates the third D2D key $K_{D2D}$ based on the received first D2D key $K_{D2D1}$ and the generated second D2D key $K_{D2D2}$. The user equipment UE2 responds to the eNodeB eNB2 that the key generation succeeds.

The eNodeB eNB2 sends the second D2D key $K_{D2D2}$ to the eNodeB eNB1 via the X2 interface. Then the eNodeB eNB1 sends the second D2D key $K_{D2D2}$ and the first random number RAND1 protected by the AS key of the user equipment UE1 to the user equipment UE1.

The user equipment UE1 generates the first D2D key $K_{D2D1}$ based on the security key $K_{UP1}$, the received first random number RAND1 and the identifier of the eNodeB eNB1, and then generates the third D2D key $K_{D2D}$ based on the received second D2D key $K_{D2D2}$ and the generated first D2D key $K_{D2D1}$.

Thus the D2D communication between the user equipments UE1, UE2 can be ciphered with the third D2D key $K_{D2D}$.

Although it is described that the method of the embodiments of the present invention can be applied to the LTE communication system, the method can also be applied to other kind of mobile communication system, such as UMTS system or 4G communication systems.

Figure 5:
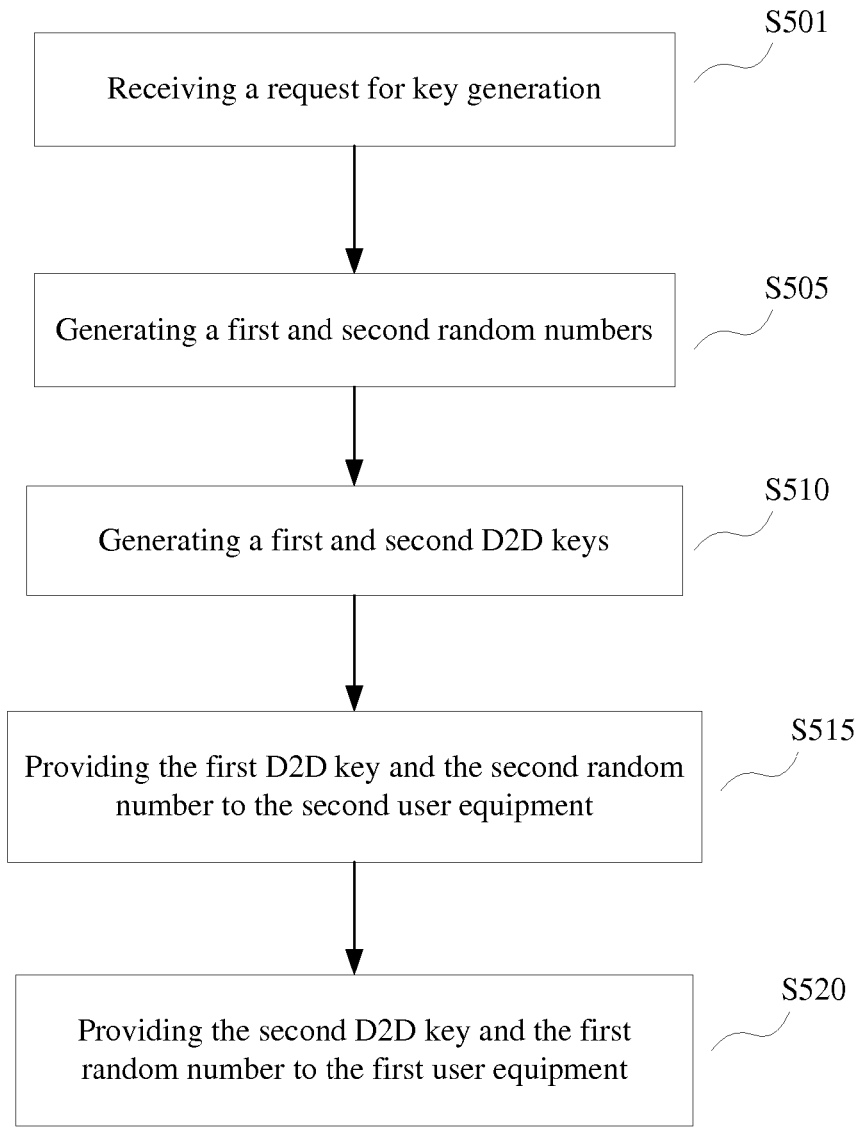
FIG. 5 is a flow chart illustrating the method of generating a key for D2D communication between a first user equipment and a second user equipment in a network device according to an exemplary embodiment of the present invention.

Under the same inventive concept, FIG. 5 is a flow chart illustrating the method of generating a key for D2D communication between a first user equipment and a second user equipment in a network device according to an exemplary embodiment of the present invention. This embodiment will be described in detail in conjunction with the figure. For the parts which are same as those of the previous embodiment, the description thereof will be omitted properly.

In this embodiment, the network device may be a separate device from the radio access node (e.g. eNodeB) and HLR/HSS/MME, and may be located within the radio access network or the core network. The network device may be connected to the radio access node.

As shown in FIG. 5, at step S501, the network device receives a request for D2D key generation. The request will be sent when the D2D connection setup is initiated between the first user equipment and the second user equipment. In this embodiment, the request may be sent from the first user equipment to its serving radio access node, for example, the first radio access node. It can be appreciated that the request may also be sent from the second user equipment. When the D2D connection is initiated, the first and second user equipments are both in RRC_Connected state with the first and second radio access nodes respectively. The request may comprise the identifiers of the first and second user equipments. The first radio access node may forward the request and some parameters required for key derivation to the network device. If the first user equipment and the second user equipment are both under the control of the same radio access node, e.g. the first radio access node (in this case, the second radio access node is the first radio access node), the identifier of the first radio access node will be provided. The first user equipment and the first radio access node may share the first security key $K_{UP1}$ that secures the ongoing communication between the first user equipment and the first radio access node. Also, the second user equipment and the first radio access node may share the second security key $K_{UP2}$ that secures the ongoing communication between the second user equipment and the first radio access node. The first and second security keys $K_{UP1}$, $K_{UP2}$ would be provided to the network device. If the first user equipment and the second user equipment are under the control of different radio access node, i.e. the first user equipment is served by the first radio access node and the second user equipment is served by the second radio access node, the first radio access node will provide its identifier and the first security key $K_{UP1}$ to the network device, and the second radio access node will provide its identifier and the second security key $K_{UP2}$ which is shared between the second user equipment and the second radio access node to the network device.

Next at step S505, the network device generates the first random number RAND1 and the second random number RAND2. Then at step S510, the network device generates the first D2D key $K_{D2D1}$ based on the first random number RAND1 and the second D2D key $K_{D2D2}$ based on the second random number RAND2. The first and second D2D keys $K_{D2D1}$, $K_{D2D2}$ may be generated by means of KDF which uses the random number RAND, the security key $K_{UP}$ and the identifier of the radio access node as input parameters.

After generating the first D2D key $K_{D2D1}$ and the second D2D key $K_{D2D2}$, the network device provides the first D2D key $K_{D2D1}$ and the second random number RAND2 to the second user equipment (step S515), and provides the second D2D key $K_{D2D2}$ and the first random number RAND1 to the first user equipment (step S520).

In the case that the network device is located within the radio access network, the network device may transmit the first and second D2D keys and the first and second random numbers to the first and second radio access nodes using an inter radio access node message. The inter radio access node message may be an X2AP message. In this case, the network device may generates an X2AP message which contains the first D2D key $K_{D2D1}$ and the second random number RAND2 and another X2AP message which contains the second D2D key $K_{D2D2}$ and the first random number RAND1. Then the network device may send the X2AP message to the second radio access node, and send another X2AP message to the first radio access node. Next the second radio access node may generate the RRC message or the user plane data packet which comprises the first D2D key $K_{D2D1}$ and the second random number RAND2, and send the RRC message or the user plane data packet to the second user equipment. Similarly, the first radio access node may generate the RRC message or the user plane data packet which comprises the second D2D key $K_{D2D2}$ and the first random number RAND1, and send the RRC message or the user plane data packet to the first user equipment. A person skilled in the art can understand that other inter radio access node message than the X2AP message may also be used to transmit the D2D keys and the identifiers of the user equipments.

In the case that the network device is located within the core network, the network device may generate a first message which contains the first D2D key $K_{D2D1}$ and the second random number RAND2, and generate a second message which contains the second D2D key $K_{D2D2}$ and the first random number RAND1. Then the network device may send the first message to the second radio access node, and send the second message to the first radio access node. The second radio access node may generate the RRC message or the user plane data packet which comprises the first D2D key $K_{D2D1}$ and the second random number RAND2, and send the RRC message or the user plane data packet to the second user equipment. Similarly, the first radio access node may generate the RRC message or the user plane data packet which comprises the second D2D key $K_{D2D2}$ and the first random number RAND1, and send the RRC message or the user plane data packet to the first user equipment. The first and second message may be S1AP messages.

The first user equipment may generate the first D2D key $K_{D2D1}$ based on the first random number RAND1, the first security key $K_{UP1}$ and the identifier of the first radio access node, and then generate the third D2D key $K_{D2D}$ based on the generated first D2D key $K_{D2D1}$ and the received second D2D key $K_{D2D2}$. The second user equipment may generate the second D2D key $K_{D2D2}$ based on the second random number RAND2, the second security key $K_{UP2}$ and the identifier of the second radio access node, and then generate the third D2D key $K_{D2D}$ based on the generated second D2D key $K_{D2D2}$ and the received first D2D key $K_{D2D1}$.

Through the above operations, the first user equipment and the second user equipment can obtain the same third D2D key for the D2D communication there between.

Figure 6:
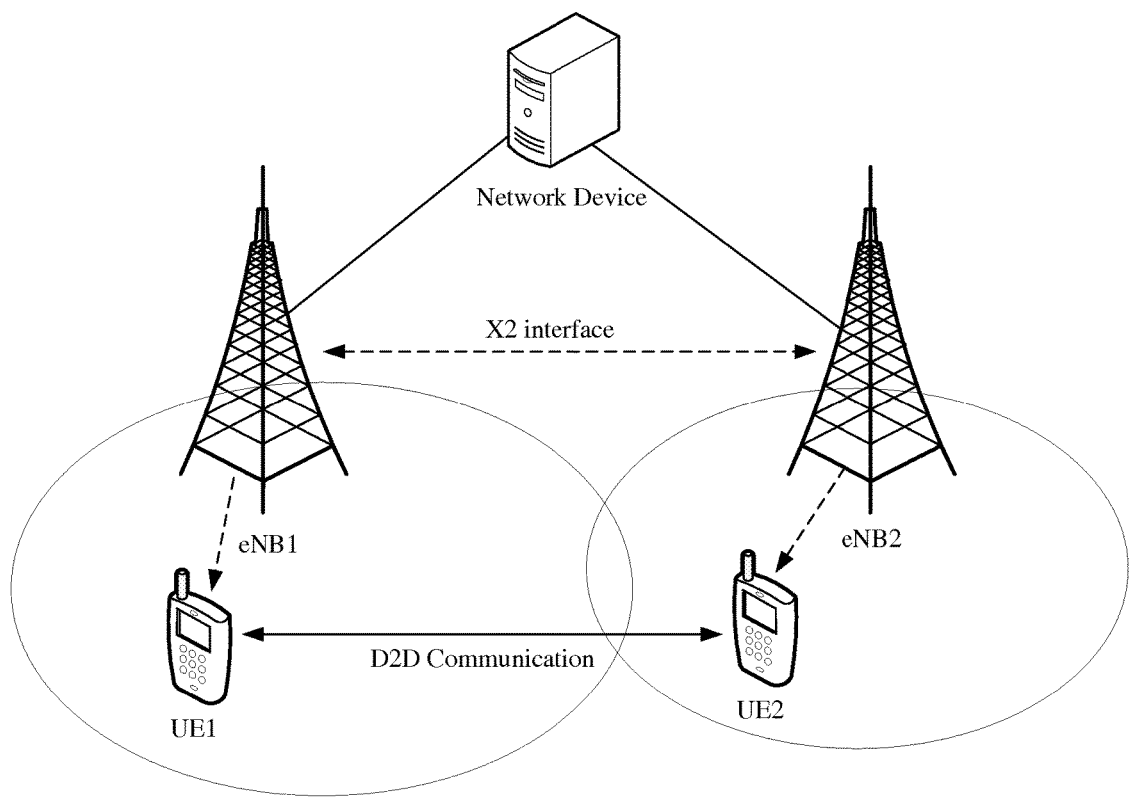
FIG. 6 is a schematic diagram of an exemplary LTE communication system in which the method of FIG. 5 can be implemented.

FIG. 6 shows an exemplary LTE communication system in which the method of FIG. 5 can be implemented. As shown in FIG. 6, the LTE communication system may comprise two eNodeBs eNB1, eNB2 and a network device which is connected to the eNodeBs eNB1, eNB2. Although FIG. 6 only shows two eNodeBs, it can be appreciated that more than two eNodeBs can be included. The user equipments UE1, UE2 may be under the control of the eNodeBs eNB1, eNB2 respectively, or both under the control of the same eNodeB. The scenario in which the user equipments UE1, UE2 are under the control of different eNodeBs can be referred to as "inter-eNodeB" scenario, and the scenario in which user equipments UE1, UE2 are both under the control of the same eNodeB can be referred to as "intra-eNodeB" scenario (not shown). In FIG. 6, the network device can execute the key generation procedure as described in conjunction with FIG. 5.

Figure 7:
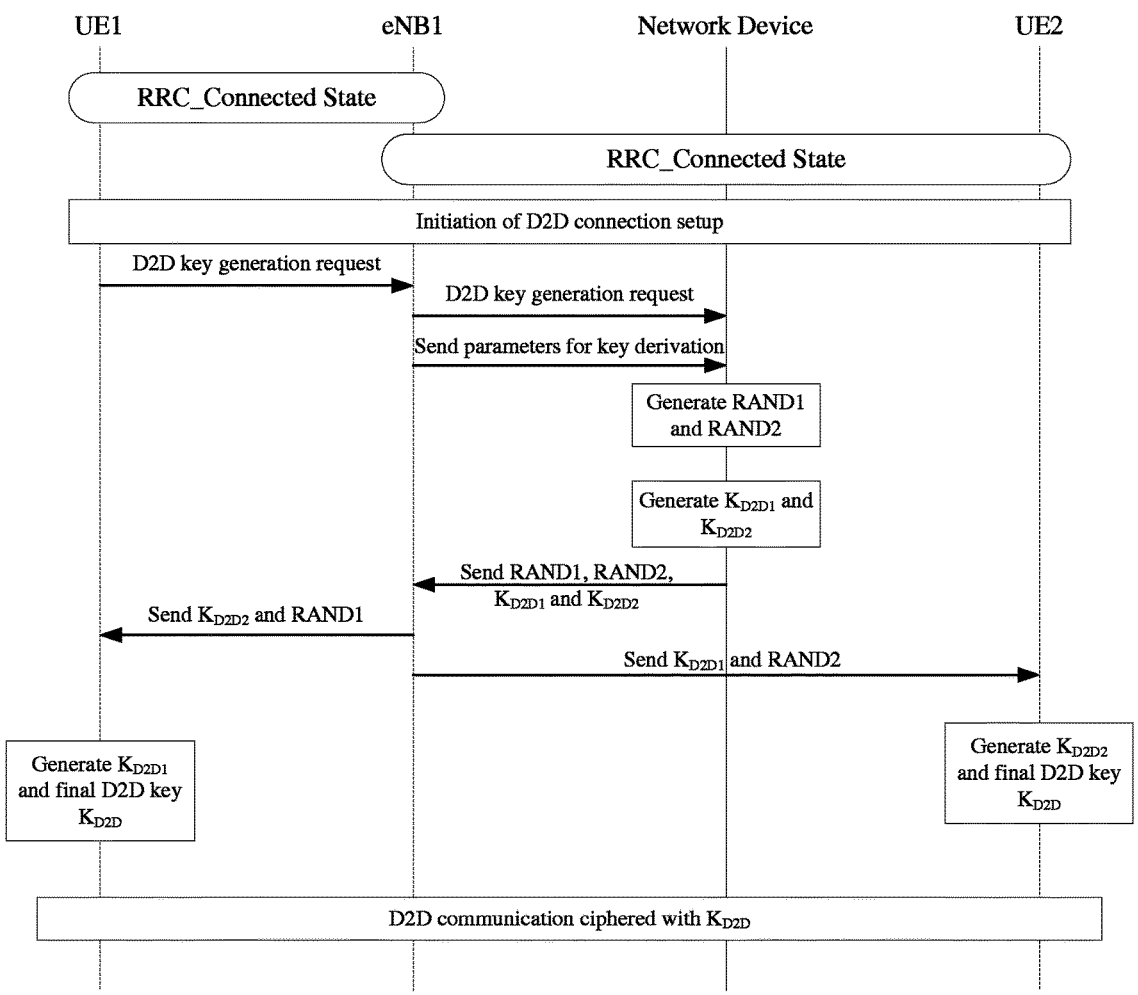
FIG. 7 is a signal chart illustrating a key generation procedure for intra-eNodeB scenario in the LTE communication system of FIG. 6.

FIG. 7 is a signal chart illustrating a key generation procedure for intra-eNodeB scenario in the LTE communication system of FIG. 6. In FIG. 7, the user equipments UE1, UE2 are both under the control of the eNodeB eNB1.

As shown in FIG. 7, the user equipment UE1 sends a D2D key generation request to the eNodeB eNB1, and the eNodeB eNB1 forwards the request to the network device together with its identifier and the first and second security keys $K_{UP1}$, $K_{UP2}$. The network device may generate the first random number RAND1 and the second random number RAND2, and then generate the first D2D key $K_{D2D1}$ based on the first random number RAND1, the first security key $K_{UP1}$ and the identifier of the eNodeB eNB1, and the second D2D key $K_{D2D2}$ based on the second random number RAND2, the second security key $K_{UP2}$ and the identifier of the eNodeB eNB1.

The network device then sends the first random number RAND1, the second random number RAND2, the first D2D key $K_{D2D1}$ and the second D2D key $K_{D2D2}$ to the eNodeB eNB1, which then sends the first random number RAND1 and the second D2D key $K_{D2D2}$ to the user equipment UE1 and sends the second random number RAND2 and the first D2D key $K_{D2D1}$ to the user equipment UE2. The user equipment UE1 may generate the first D2D key $K_{D2D1}$ based on the first random number RAND1, the first security key $K_{UP1}$ and the identifier of the eNodeB eNB1, and then generate the third D2D key $K_{D2D}$ based on the first D2D key $K_{D2D1}$ and the second D2D key $K_{D2D2}$. The user equipment UE2 may generate the second D2D key $K_{D2D2}$ based on the second random number RAND2, the second security key $K_{UP2}$ and the identifier of the eNodeB eNB1, and then generate the third D2D key $K_{D2D}$ based on the first D2D key $K_{D2D1}$ and the second D2D key $K_{D2D2}$.

Figure 8:
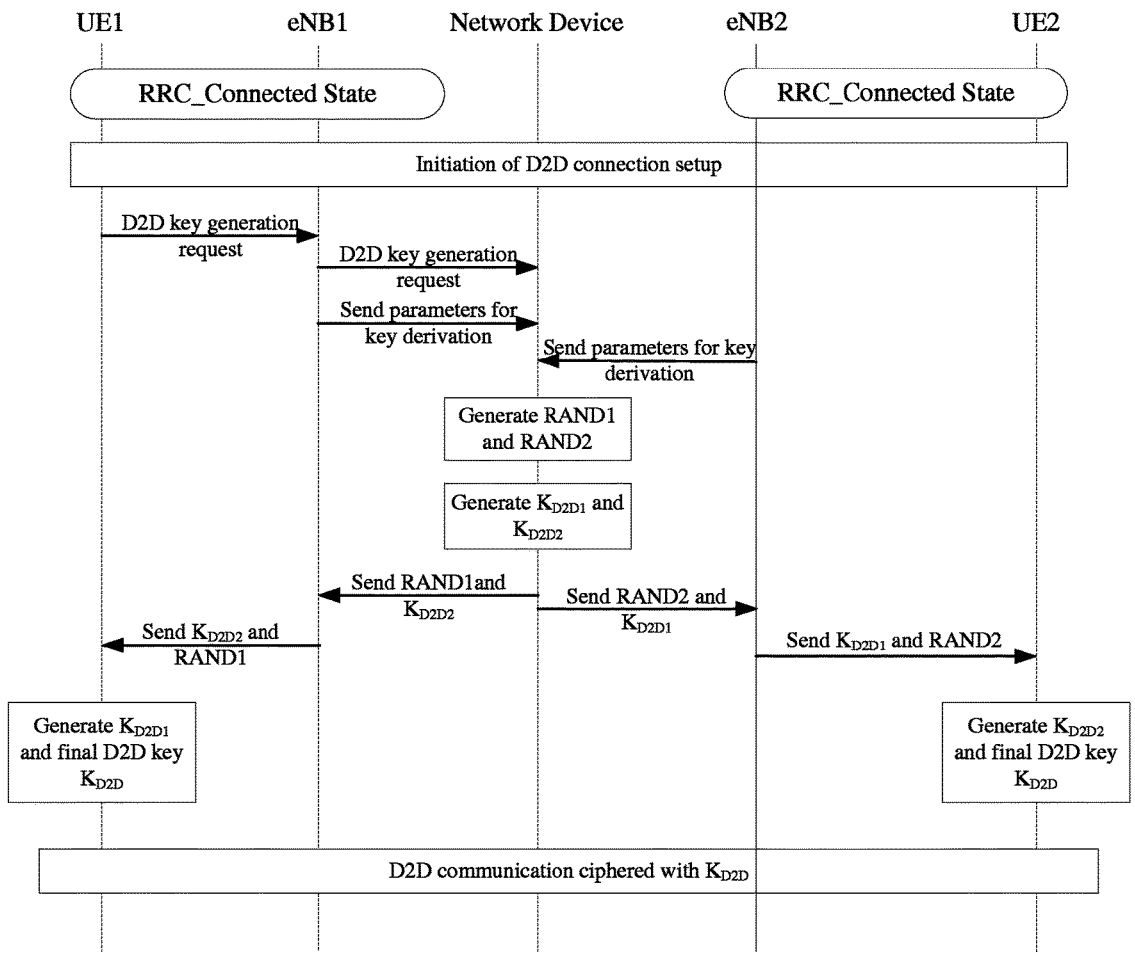
FIG. 8 is a signal chart illustrating a key generation procedure for inter-eNodeB scenario in the LTE communication system of FIG. 6.

FIG. 8 is a signal chart illustrating a key generation procedure for inter-eNodeB scenario in the LTE communication system of FIG. 6. In FIG. 8, the user equipments UE1 is under the control of the eNodeB eNB1, and the user equipments UE2 is under the control of the eNodeB eNB2.

As shown in FIG. 8, the user equipment UE1 sends a D2D key generation request to the eNodeB eNB1, and the eNodeB eNB1 forwards the request to the network device together with its identifier and the first security key $K_{UP1}$. The eNodeB eNB2 sends its identifier and the second security key $K_{UP2}$ to the network device. The network device may generate the first random number RAND1 and the second random number RAND2, and then generate the first D2D key $K_{D2D1}$ based on the first random number RAND1, the first security key $K_{UP1}$ and the identifier of the eNodeB eNB1, and the second D2D key $K_{D2D2}$ based on the second random number RAND2, the second security key $K_{UP2}$ and the identifier of the eNodeB eNB2.

The network device then sends the first random number RAND1 and the second D2D key $K_{D2D2}$ to the eNodeB eNB1, and sends the second random number RAND2 and the first D2D key $K_{D2D1}$ to the eNodeB eNB2. The eNodeB eNB1 may send the first random number RAND1 and the second D2D key $K_{D2D2}$ to the user equipment UE1, and the eNodeB eNB2 may send the second random number RAND2 and the first D2D key $K_{D2D1}$ to the user equipment UE2. The user equipment UE1 may generate the first D2D key $K_{D2D1}$ based on the first random number RAND1, the first security key $K_{UP1}$ and the identifier of the eNodeB eNB1, and then generate the third D2D key $K_{D2D}$ based on the first D2D key $K_{D2D1}$ and the second D2D key $K_{D2D2}$. The user equipment UE2 may generate the second D2D key $K_{D2D2}$ based on the second random number RAND2, the second security key $K_{UP2}$ and the identifier of the eNodeB eNB1, and then generate the third D2D key $K_{D2D}$ based on the first D2D key $K_{D2D1}$ and the second D2D key $K_{D2D2}$.

Figure 9:
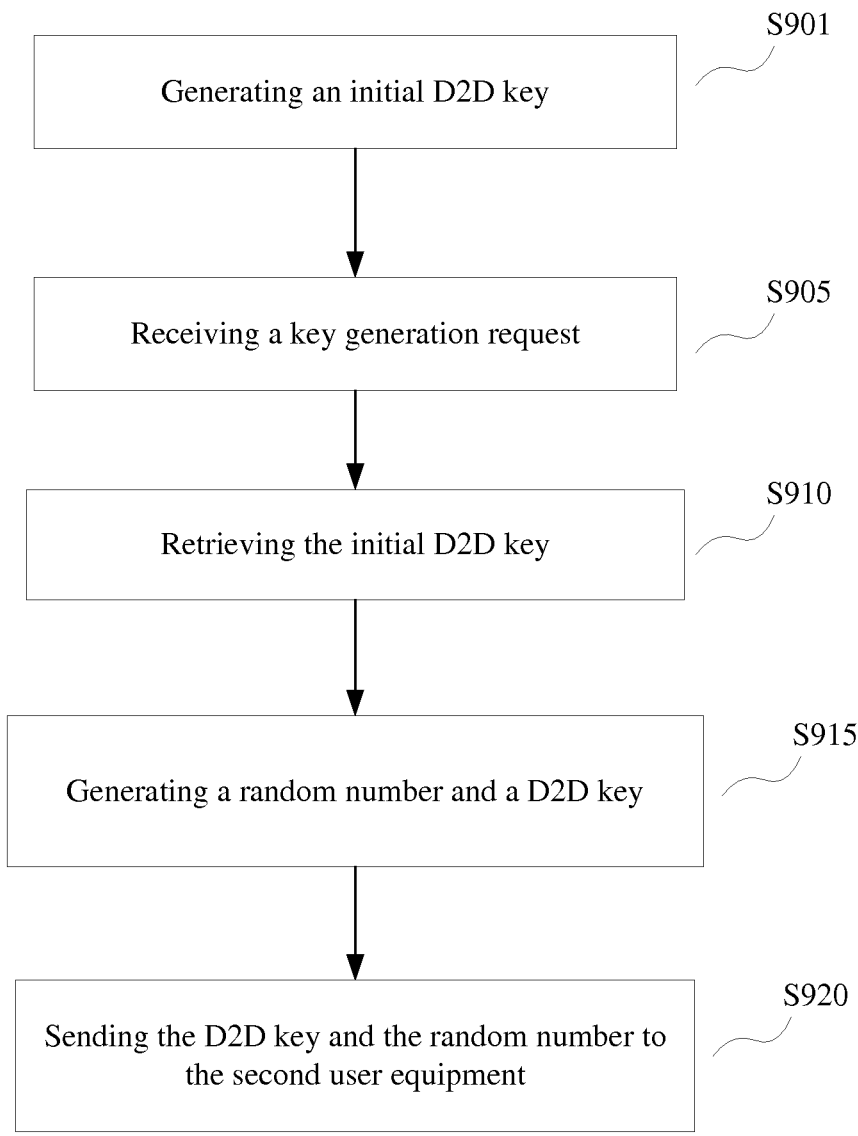
FIG. 9 is a flow chart illustrating the method of generating a key for D2D communication between a first user equipment and a second user equipment in a radio access node according to an exemplary embodiment of the present invention.

FIG. 9 is a flow chart illustrating the method of generating a key for D2D communication between a first user equipment and a second user equipment in a radio access node according to an exemplary embodiment of the present invention.

In this embodiment, the first user equipment and the second user equipment are both under the control of the radio access node.

As shown in FIG. 9, at step S901, the radio access node generates an initial D2D key $K_{D2Din}$ of the first user equipment, and allocates an index value to the initial D2D key $K_{D2Din}$. So the initial D2D key $K_{D2Din}$ is shared between the first user equipment and the radio access node, and is indexed with the index value.

In an exemplary embodiment, the first user equipment may send a message indicating D2D capability of the first user equipment during attachment of the first user equipment. After receiving the message, the radio access node may generate the initial D2D key $K_{D2Din}$ for the first user equipment through an EPS AKA procedure. During the EPS AKA procedure, the first user equipment is in RRC_Connected state under the radio access node, and there is an ongoing EPS service between the first user equipment and the radio access node. The radio access node may generate the initial D2D key $K_{D2Din}$ based on a security key which secures the ongoing EPS service, the identifier of the first user equipment, the identifier of the radio access node and a random number. Then the radio access node may allocate an index value to the initial D2D key. The security key may be a ciphering key for ciphering user plane data of the first user equipment or an integration key. The initial D2D key $K_{D2Din}$ may be stored in the radio access node associated with the index value. Also, the radio access node can store the initial D2D keys for all the attached user equipments associated with their respective index values.

In another exemplary example, the generation of the initial D2D key $K_{D2Din}$ may occur during D2D connection setup using generic bootstrapping architecture (GBA). The first user equipment may send a D2D connection request to the second user equipment, which may respond that a bootstrapping procedure is required. Then the bootstrapping procedure may be initiated between the first user equipment and the radio access node, and the radio access node may generate the initial D2D key $K_{D2Din}$ using key derivation function (KDF) of the GBA in 3GPP TS33.220 or TS 33.259. Then the radio access node may allocate an index value to the initial D2D key $K_{D2Din}$, and store the initial D2D key $K_{D2Din}$ associated with the index value.

After step S901, the radio access node and the first user equipment can share the initial D2D key $K_{D2Din}$ for the first user equipment and the associated index value.

Then after the D2D connection is established between the first user equipment and the second user equipment, at step S905, the radio access node may receive a key generation request from the second user equipment. The key generation request may contain a given index value and the identifier of the second user equipment. The given index value is provided by the first user equipment to the second user equipment.

Then at step S910, the radio access node retrieves an initial D2D key $K_{D2Din}$ based on the given index value. At step S915, the radio access node can generate a random number and then generate a D2D key based on the retrieved initial D2D key $K_{D2Din}$, the identifier of the second user equipment and the random number.

At step S920, the radio access node may send the generated D2D key and the random number to the second user equipment. Optionally, the radio access node may also send a lifetime of the generated D2D key to the second user equipment.

The second user equipment may store the received D2D key which will be used as the D2D key for the D2D communication between the first user equipment and the second user equipment, and, optionally, the lifetime. Then the second user equipment sends the received random number and the identifier of the second user equipment to the first user equipment. Then the first user equipment may use the initial D2D key $K_{D2Din}$, the received random number and the identifier of the second user equipment to generate a D2D key for the D2D communication between the first user equipment and the second user equipment.

Thus the first user equipment and the second user equipment can use the same D2D key to secure the D2D communication therebetween.

Figure 10:
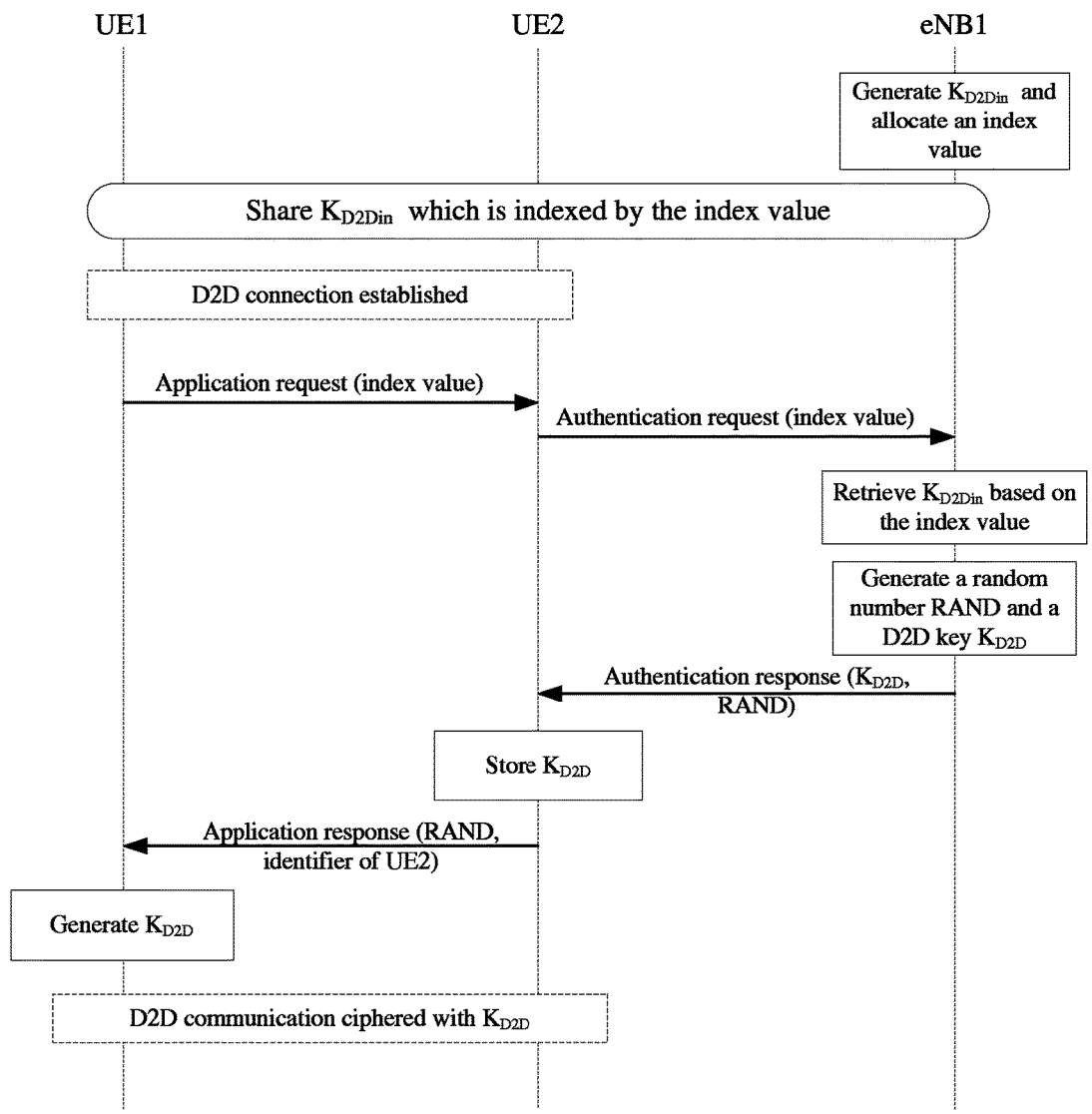
FIG. 10 is a signal chart illustrating a key generation procedure for intra-eNodeB scenario in the LTE communication system of FIG. 2.

FIG. 10 is a signal chart illustrating a key generation procedure for intra-eNodeB scenario in the LTE communication system of FIG. 2 using the method shown in FIG. 9. In FIG. 10, the eNodeB eNB1 is regarded as the radio access node, and the user equipments UE1, UE2 are regarded as the first and second user equipments respectively.

As shown in FIG. 10, the user equipment UE1 and the eNodeB eNB1 share an initial D2D key $K_{D2Din}$ and associated index value. Firstly, the user equipment UE1 may send a request for generating a key for D2D communication between the user equipments UE1 and UE2 to the user equipment UE2. The request may contain the index value which is associated with its initial D2D key $K_{D2Din}$ for the user equipment UE1. The request may be an application request of GBA, for example. Then the user equipment UE2 may send a request which contains the received index value and its identifier to the eNodeB eNB1. The request may be an authentication request for example.

After receiving the request from the user equipment UE2, the eNodeB eNB1 obtains the index value from the request and retrieves the initial D2D key $K_{D2Din}$ of the user equipment UE1 based on the index value. Then the eNodeB eNB1 generates a random number RAND, and uses the retrieved initial D2D key $K_{D2Din}$, the random number RAND and the identifier of the user equipment UE2 as input parameters of the key derivation function to generate the D2D key $K_{D2D}$.

The eNodeB eNB1 may send an authentication response including the generated D2D key $K_{D2D}$ and the random number RAND back to the user equipment UE2. Optionally, the authentication response may comprise a lifetime of the generated D2D key. Upon receipt of the authentication response, the user equipment UE2 may store the D2D key $K_{D2D}$ for use in the D2D communication in future and its lifetime. Then the user equipment UE2 sends an application response to the user equipment UE1. The application response may comprise the random number RAND and the identifier of the user equipment UE2.

The user equipment UE1 may generate the D2D key $K_{D2D}$ based on the received random number RAND, the initial D2D key $K_{D2Din}$ of the user equipment UE1 and the identifier of the user equipment UE2. So the user equipment UE1 can use the generated D2D key $K_{D2D}$ to secure the D2D communication between the user equipments UE1 and UE2.

Figure 11:
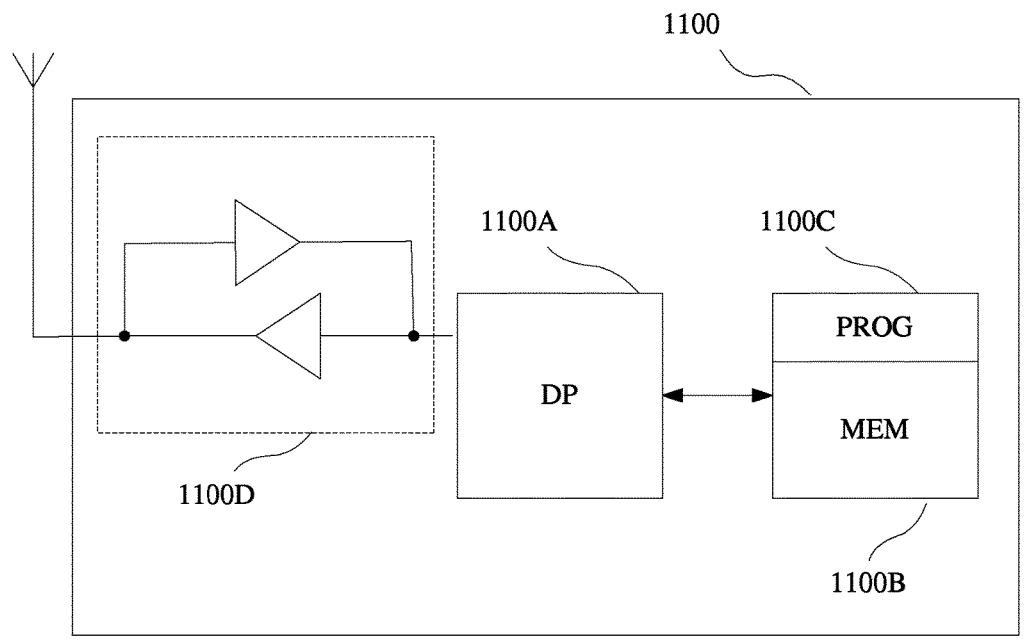
FIG. 11 is a schematic block diagram illustrating the radio access node according to an exemplary embodiment of the present invention.

FIG. 11 is a schematic block diagram illustrating the radio access node 1100 according to an exemplary embodiment of the present invention. In FIG. 11, the radio access node 1100 may comprise a data processor (DP) 1100A, a memory (MEM) 1100B that stores a program (PROG) 1100C, a transceiver 1100D and an antenna.

At least one of the PROG 1100C is assumed to comprise program instructions that, when executed by the associated DP 1100A, enable the radio access node 1100 to operate in accordance with the exemplary embodiment of the method shown in FIG. 1, as discussed above. That is, the exemplary embodiment of the method shown in FIG. 1 may be implemented at least in part by computer software executable by the DP 1100A of the radio access node 1100, or by hardware, or by a combination of software and hardware.

Also, the program instructions can enable the radio access node 1100 to operate in accordance with the exemplary embodiment of the method shown in FIG. 9.

Figure 12:
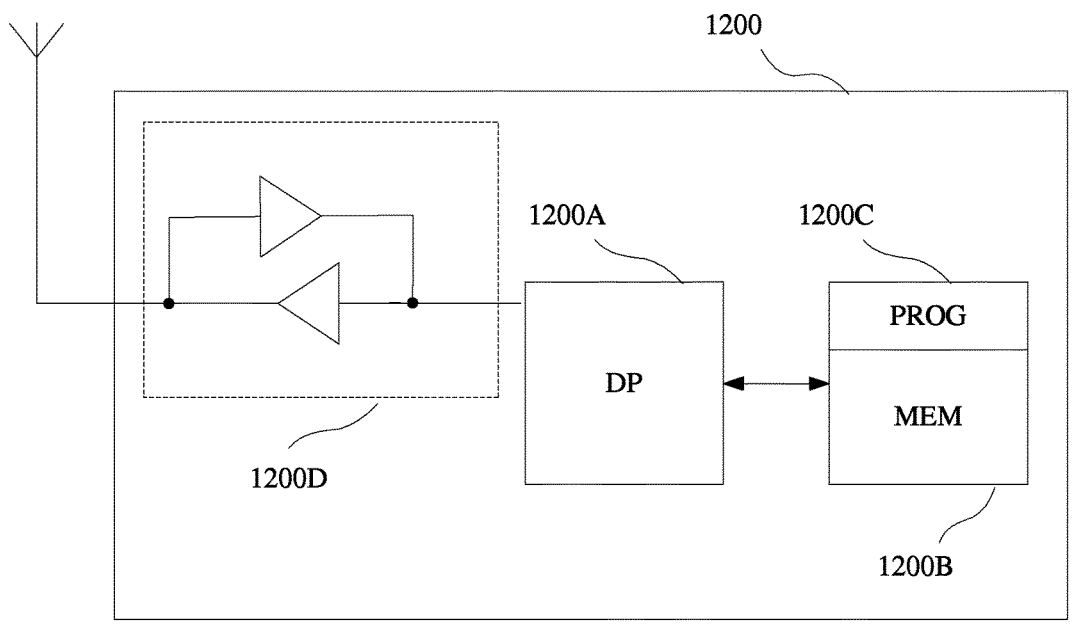
FIG. 12 is a schematic block diagram illustrating the network device according to an exemplary embodiment of the present invention.

FIG. 12 is a schematic block diagram illustrating the network device 1200 according to an exemplary embodiment of the present invention. In FIG. 12, the network device 1200 may comprise a data processor (DP) 1200A, a memory (MEM) 1200B that stores a program (PROG) 1200C, a transceiver 1200D and an antenna.

At least one of the PROG 1200C is assumed to comprise program instructions that, when executed by the associated DP 1200A, enable the network device 1200 to operate in accordance with the exemplary embodiment of the method shown in FIG. 5, as discussed above. That is, the exemplary embodiment of the method shown in FIG. 5 may be implemented at least in part by computer software executable by the DP 1200A of the network device 1200, or by hardware, or by a combination of software and hardware.

The MEM 1100B, 1200B may be of any type suitable to the local technical environment and may be implemented using any suitable data storage technology, such as semiconductor based memory devices, flash memory, magnetic memory devices and systems, optical memory devices and systems, fixed memory and removable memory. The DP 1100A, 1200A may be of any type suitable to the local technical environment, and may comprise one or more of general purpose computers, special purpose computers, microprocessors, digital signal processors (DSPs) and processors based on multi-core processor architectures, as non-limiting examples.

Alternatively or optionally, according to an exemplary embodiment of the invention, an apparatus of generating a key for D2D communication between a first user equipment and a second user equipment in a first radio access node is provided, which comprises: means for receiving a request for D2D key generation from the first user equipment which is served by the first radio access node; means for determining whether the second user equipment is served by the first radio access node; means for, when it is determined that the second user equipment is served by the first radio access node, generating a first random number and a second random number; means for generating a first D2D key based on the first random number and a second D2D key based on the second random number; means for sending the first D2D key and the second random number to the second user equipment, wherein the second random number is used by the second user equipment to generate the second D2D key, and the first D2D key is used together with the generated second D2D key to generate a third D2D key; means for, when it is determined that the second user equipment is not served by the first radio access node, determining a second radio access node which serves the second user equipment; means for generating a first random number; means for generating a first D2D key based on the first random number; means for sending the first D2D key to the second radio access node; means for receiving a second D2D key from the second radio access node; and means for sending the second D2D key and the first random number to the first user equipment, wherein the first random number is used by the first user equipment to generate the first D2D key, and the second D2D key is used together with the generated first D2D key to generate the third D2D key.

Alternatively or optionally, according to an exemplary embodiment of the invention, an apparatus of generating a key for D2D communication between a first user equipment and a second user equipment in a network device is provided, which comprises: means for receiving a request for D2D key generation; means for generating a first random number and a second random number; means for generating a first D2D key based on the first random number and a second D2D key based on the second random number; means for providing the first D2D key and the second random number to the second user equipment, wherein the second random number is used by the second user equipment to generate the second D2D key, and the first D2D key is used together with the generated second D2D key to generate a third D2D key; and means for providing the second D2D key and the first random number to the first user equipment, wherein the first random number is used by the first user equipment to generate the first D2D key, and the second D2D key is used together with the generated first D2D key to generate the third D2D key.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the invention may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention comprises any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method of generating a key for device-to-device communication between a first user equipment and a second user equipment, comprising:
   receiving, at a first radio access node, a request for device-to-device key generation from the first user equipment which is served by the first radio access node;
   determining, at the first radio access node, whether the second user equipment is served by the first radio access node;
   when it is determined that the second user equipment is served by the first radio access node,
     generating, at the first radio access node, a first random number and a second random number,
     generating, at the first radio access node, a first device-to-device key based on the first random number and a second device-to-device key based on the second random number,
     sending, at the first radio access node, the first device-to-device key and the second random number to the second user equipment, wherein the second random number is used by the second user equipment to generate the second device-to-device key, and the first device-to-device key is used with the generated second device-to-device key to generate a third device-to-device key, and sending, at the first radio access node, the second device-to-device key and the first random number to the first user equipment, wherein the first random number is used by the first user equipment to generate the first device-to-device key, and the second device-to-device key is used with the generated first device-to-device key to generate the third device-to-device key; and when it is determined that the second user equipment is not served by the first radio access node, determining, at the first radio access node, a second radio access node which serves the second user equipment, generating, at the first radio access node, a first random number, generating, at the first radio access node, a first device-to-device key based on the first random number, sending, at the first radio access node, the first device-to-device key to the second radio access node, receiving, at the first radio access node, a second device-to-device key from the second radio access node, and sending, at the first radio access node, the second device-to-device key and the first random number to the first user equipment, wherein the first random number is used by the first user equipment to generate the first device-to-device key, and the second device-to-device key is used with the generated first device-to-device key to generate a third device-to-device key.

2. The method according to claim 1, wherein when the first user equipment and the second user equipment are both served by the first radio access node, the generating of the first device-to-device key and the second device-to-device key comprises:

generating the first device-to-device key based on the first random number, a first security key that secures an ongoing communication between the first user equipment and the first radio access node, and an identifier of the first radio access node; and generating the second device-to-device key based on the second random number, a second security key that secures an ongoing communication between the second user equipment and the first radio access node, and the identifier of the first radio access node.

3. The method according to claim 2, wherein the first security key is a ciphering key for ciphering user plane data of the first user equipment, and the second security key is a ciphering key for ciphering user plane data of the second user equipment.

4. The method according to claim 2, wherein the first security key and the second security key are integrity protection keys.

5. The method according to claim 1, wherein when the first user equipment is served by the first radio access node and the second user equipment is served by the second radio access node, the generating of the first device-to-device key comprises:

generating the first device-to-device key based on the first random number, a first security key that secures an ongoing communication between the first user equipment and the first radio access node, and an identifier of the first radio access node.

6. The method according to claim 1, wherein the sending of the first device-to-device key and the second random number to the second user equipment comprises:

generating a radio resource control message which contains the first device-to-device key and the second random number;

ciphering and integrity protecting the radio resource control message with an access stratum key of the second user equipment; and sending the ciphered and integrity protected radio resource control message to the second user equipment.

7. The method according to claim 1, wherein the sending of the first device-to-device key and the second random number to the second user equipment comprises:

generating a user plane data packet which contains the first device-to-device key and the second random number;

ciphering the user plane data packet with the second security key; and sending the ciphered user plane data packet to the second user equipment.

8. The method according to claim 1, wherein the sending of the second device-to-device key and the first random number to the first user equipment comprises:

generating a radio resource control message which contains the second device-to-device key and the first random number;

ciphering and integrity protecting the radio resource control message with an access stratum key of the first user equipment; and sending the ciphered and integrity protected radio resource control message to the first user equipment.

9. The method according to claim 1, wherein the sending of the second device-to-device key and the first random number to the first user equipment comprises:

generating a user plane data packet which contains the second device-to-device key and the first random number;

ciphering the user plane data packet with the first security key; and sending the ciphered user plane data packet to the first user equipment.

10. The method according to claim 1, wherein the sending of the first device-to-device key to the second radio access node comprises:

generating an inter radio access node message which contains the first device-to-device key; and sending the inter radio access node message to the second radio access node.

11. A method of generating a key for device-to-device communication between a first user equipment and a second user equipment comprising:

receiving, at a first radio access node, a request for device-to-device key generation, wherein the first radio access node interfaces a radio access network;

generating, at the first radio access node, a first random number and a second random number;

generating, at the first radio access node, a first device-to-device key based on the first random number and a second device-to-device key based on the second random number;

sending, at the first radio access node, the first device-to-device key and the second random number to the second user equipment, wherein the second random number is used by the second user equipment to generate the second device-to-device key, and the first device-to-device key is used with the generated second device-to-device key to generate a third device-to-device key; and sending, at the first radio access node, the second device-to-device key and the first random number to the first user equipment, wherein the first random number is used by the first user equipment to generate the first device-to-device key, and the second device-to-device key is used with the generated first device-to-device key to generate the third device-to-device key.

12. The method according to claim 11, wherein the generating of the first device-to-device key and the second device-to-device key comprises:

generating the first device-to-device key based on the first random number, a first security key that secures an ongoing communication between the first user equipment and the first radio access node that serves the first user equipment, and an identifier of the first radio access node; and generating the second device-to-device key based on the second random number, a second security key that secures an ongoing communication between the second user equipment and a second radio access node that serves the second user equipment, and the identifier of the second radio access node.

13. The method according to claim 12, wherein the first security key is a ciphering key for ciphering user plane data of the first user equipment, and the second security key is a ciphering key for ciphering user plane data of the second user equipment.

14. The method according to claim 12, wherein the first security key and the second security key are integrity protection keys.

15. The method according to claim 12, wherein the providing of the first device-to-device key and the second random number to the second user equipment comprises:

generating an inter radio access node message which contains the first device-to-device key and the second random number; and sending the inter radio access node message to the second radio access node, wherein the first device-to-device key and the second random number in the inter radio access node message comprises a radio resource control message and/or a user plane data packet;

wherein the providing of the second device-to-device key and the first random number to the first user equipment comprises:

generating an inter radio access node message which contains the second device-to-device key and the first random number; and sending the inter radio access node message to the first radio access node, wherein the second device-to-device key and the first random number in the inter radio access node message comprises a radio resource control message and/or a user plane data packet.

16. The method according to claim 12, wherein the providing of the first device-to-device key and the second random number to the second user equipment comprises:

generating a first message which contains the first device-to-device key and the second random number; and sending the first message to the second radio access node, wherein the first device-to-device key and the second random number in the first message comprises a radio resource control message and/or a user plane data packet;

wherein the providing of the second device-to-device key and the first random number to the first user equipment comprises:

generating a second message which contains the first device-to-device key and the second random number; and sending the second message to the first radio access node, wherein the second device-to-device key and the first random number in the second message comprises a radio resource control message and/or a user plane data packet.

17. An apparatus comprising:
at least one processor; and
at least one memory including computer program code;
the at least one memory and the computer program code configured to, with the at least one processor, cause the apparatus to at least:

receive a request for device-to-device key generation, the apparatus comprising, or comprised in, a first radio access node interfacing a radio access network;

generate a first random number and a second random number;

generate a first device-to-device key based on the first random number and a second device-to-device key based on the second random number;

send the first device-to-device key and the second random number to a second user equipment, wherein the second random number is used by the second user equipment to generate the second device-to-device key, and the first device-to-device key is used with the generated second device-to-device key to generate a third device-to-device key; and send the second device-to-device key and the first random number to a first user equipment, wherein the first random number is used by the first user equipment to generate the first device-to-device key, and the second device-to-device key is used with the generated first device-to-device key to generate the third device-to-device key.

18. The apparatus according to claim 17, wherein the apparatus is further caused to at least:

generate the first device-to-device key based on the first random number, a first security key that secures an ongoing communication between the first user equipment and the first radio access node that serves the first user equipment, and an identifier of the first radio access node; and generate the second device-to-device key based on the second random number, a second security key that secures an ongoing communication between the second user equipment and a second radio access node that serves the second user equipment, and the identifier of the second radio access node.

19. The apparatus according to claim 18, wherein the first security key is a ciphering key for ciphering user plane data of the first user equipment, and the second security key is a ciphering key for ciphering user plane data of the second user equipment; or the first security key and the second security key are integrity protection keys.

20. The apparatus according to claim 18, wherein the apparatus is further caused to at least:

generate an inter radio access node message which contains the first device-to-device key and the second random number; and send the inter radio access node message to the second radio access node, wherein the first device-to-device key and the second random number in the inter radio access node message comprise a radio resource control message and/or a user plane data packet;
wherein the apparatus is further caused to at least:
generate an inter radio access node message which contains the second device-to-device key and the first random number; and
send the inter radio access node message to the first radio access node, wherein the second device-to-device key and the first random number in the inter radio access node message comprising a radio resource control message and/or a user plane data packet.

* * * * *